(12) United States Patent
Hirata et al.

(10) Patent No.: US 11,804,765 B2
(45) Date of Patent: Oct. 31, 2023

(54) VIBRATING MOTOR AND HAPTIC DEVICE

(71) Applicant: Nidec Corporation, Kyoto (JP)

(72) Inventors: Atsunori Hirata, Kyoto (JP); Ryoichi Mitsuhata, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 137 days.

(21) Appl. No.: 17/547,302

(22) Filed: Dec. 10, 2021

(65) Prior Publication Data

US 2022/0209639 A1 Jun. 30, 2022

(30) Foreign Application Priority Data

Dec. 25, 2020 (JP) ................................ 2020-217902

(51) Int. Cl.
*H02K 33/02* (2006.01)
(52) U.S. Cl.
CPC .................................. *H02K 33/02* (2013.01)
(58) Field of Classification Search
CPC .. H02K 7/1869; H02K 7/1876; H02K 7/1892; H02K 33/00; H02K 33/02; H02K 33/06; H02K 33/08; H02K 33/10; H02K 33/12; H02K 33/14; H02K 33/16; H02K 33/18; H02K 35/02
USPC ........ 310/25, 15, 12.01, 81, 80, 321, 20, 21, 310/28–30, 36–37
See application file for complete search history.

(56) References Cited

U.S. PATENT DOCUMENTS

| | | | | |
|---|---|---|---|---|
| 6,323,568 B1 * | 11/2001 | Zabar | ..................... | H02K 33/04 310/12.24 |
| 6,326,706 B1 * | 12/2001 | Zhang | ................... | F04B 35/045 310/12.32 |
| 7,078,832 B2 * | 7/2006 | Inagaki | ..................... | H02K 7/14 335/238 |
| 7,316,545 B2 * | 1/2008 | Lenke | .................... | F04B 17/046 92/169.1 |
| 7,981,107 B2 * | 7/2011 | Olsen | ................ | A61M 5/14276 604/152 |
| 9,004,883 B2 * | 4/2015 | Neelakantan | ......... | F04B 17/046 417/415 |
| 9,906,109 B2 * | 2/2018 | Endo | ...................... | H02K 33/16 |

(Continued)

FOREIGN PATENT DOCUMENTS

| | | | | |
|---|---|---|---|---|
| JP | 2006-183754 A | | 7/2006 | |
| WO | WO-2010067753 A1 | * | 6/2010 | ......... A61C 17/3445 |
| WO | WO-2012002329 A1 | * | 1/2012 | ............. H02K 33/02 |

*Primary Examiner* — Maged M Almawri
(74) *Attorney, Agent, or Firm* — KEATING & BENNETT (57) ABSTRACT

A vibrating motor includes a stationary portion, and a movable portion able to vibrate with respect to the stationary portion along a center axis extending in a vertical direction. The stationary portion includes a bearing portion which supports the movable portion to be able to vibrate along the center axis and has a tubular shape extending along the center axis, a coil which directly opposes at least a portion of the movable portion in a radial direction, and a top surface portion which is above the movable portion and connected to the movable portion with an elastic portion therebetween. The bearing portion includes a first region which opposes the movable portion in the radial direction with a first gap therebetween, and a second region which is above the first region and opposes the movable portion in the radial direction with a second gap wider than the first gap therebetween.

11 Claims, 7 Drawing Sheets

(56) References Cited

U.S. PATENT DOCUMENTS

| | | | |
|---|---|---|---|
| 10,424,429 B2* | 9/2019 | Fatemi | H01F 7/1607 |
| 10,890,169 B2* | 1/2021 | Jeong | F04B 39/0061 |
| 2002/0195884 A1* | 12/2002 | Ichii | A61C 17/34 |
| | | | 310/15 |
| 2004/0128781 A1* | 7/2004 | Kunita | H02K 33/08 |
| | | | 15/22.2 |
| 2004/0241017 A1* | 12/2004 | Buzzi | F04B 19/006 |
| | | | 417/415 |
| 2005/0089418 A1* | 4/2005 | Bonfardeci | F04B 17/046 |
| | | | 417/417 |
| 2009/0232666 A1* | 9/2009 | Choi | H02K 33/16 |
| | | | 417/212 |
| 2011/0133577 A1* | 6/2011 | Lee | H02K 33/18 |
| | | | 310/15 |
| 2013/0169071 A1* | 7/2013 | Endo | H02K 33/12 |
| | | | 310/25 |
| 2017/0214306 A1* | 7/2017 | Katada | H02K 33/16 |
| 2018/0219465 A1* | 8/2018 | Katada | B06B 1/045 |
| 2018/0250107 A1* | 9/2018 | Dai | H02K 1/2791 |
| 2020/0076287 A1 | 3/2020 | Takahashi et al. | |

* cited by examiner

VIBRATING MOTOR AND HAPTIC DEVICE

CROSS-REFERENCE TO RELATED APPLICATIONS

The present application claims priority under 35 U.S.C. § 119 to Japanese Patent Application No. 2020-217902, filed on Dec. 25, 2020, the entire contents of which are hereby incorporated herein by reference.

1. FIELD OF THE INVENTION

The present disclosure relates to a vibrating motor and a haptic device.

2. BACKGROUND

Conventionally, various devices such as portable devices like smartphones have been provided with a vibrating motor as a vibration generator. The vibrating motor is used for a function of notifying the user of an incoming call, an alarm, or the like, or a function of haptic feedback in a human interface, for example.

A vibrating motor includes a case, a coil, an elastic portion, and a movable portion. The movable portion includes a magnet. The movable portion and the case are often connected by an elastic portion. When the coil is energized to generate a magnetic field, the movable portion vibrates.

Herein, conventionally, in a case where the magnet included in the movable portion and the coil directly face each other in a radial direction orthogonal to the vibration direction with a gap interposed therebetween, an electromagnetic force acts between the magnet and the coil, and thus, there is a possibility that the accuracy of the radial position of the movable portion is lowered. As a result, the vibration characteristics of the vibrating motor may be deteriorated.

SUMMARY

An example embodiment of a vibrating motor of the present disclosure includes a stationary portion, and a movable portion able to vibrate with respect to the stationary portion along a center axis extending in a vertical direction. The stationary portion includes a bearing portion which supports the movable portion to be able to vibrate along the center axis and has a tubular shape extending along the center axis, a coil which directly or indirectly opposes at least a portion of the movable portion in a radial direction, and a top surface portion which is above the movable portion and connected to the movable portion with an elastic portion interposed therebetween. The bearing portion includes a first region which opposes the movable portion in the radial direction with a first gap interposed therebetween, and a second region which is above the first region and opposing the movable portion in the radial direction with a second gap wider than the first gap interposed therebetween. The first region and the second region are integrally provided. The second region is fixed to the top surface portion.

Another example embodiment of a vibrating motor of the present disclosure includes a stationary portion, and a movable portion able to vibrate with respect to the stationary portion along a center axis extending in a vertical direction. The stationary portion includes a bearing portion which supports the movable portion to be able to vibrate along the center axis and has a tubular shape extending along the center axis, a coil which directly or indirectly opposes at least a portion of the movable portion in a radial direction, and a housing which includes a tubular shape extending along the center axis and made of a magnetic material. The housing houses the bearing portion, the coil, and the movable portion. An outer cylinder portion, which opposes the movable portion in the radial direction with a gap interposed therebetween and is made of a non-magnetic material, is on a radially inner surface of the housing.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described hereinbelow with reference to the drawings.

Incidentally, in the drawings, a direction in which a center axis J of a vibrating motor 10 extends is referred to as a "vertical direction", an upper side is referred to as X1, and a lower side is referred to as X2. Incidentally, the vertical direction does not limit the attaching direction of the vibrating motor 10 when the vibrating motor 10 is mounted on a device.

A radial direction with respect to the center axis J is simply referred to as a "radial direction", a direction approaching the center axis J is referred to as a radially inward direction, and a direction away from the center axis J is referred to as a radially outward direction.

Figure 1:
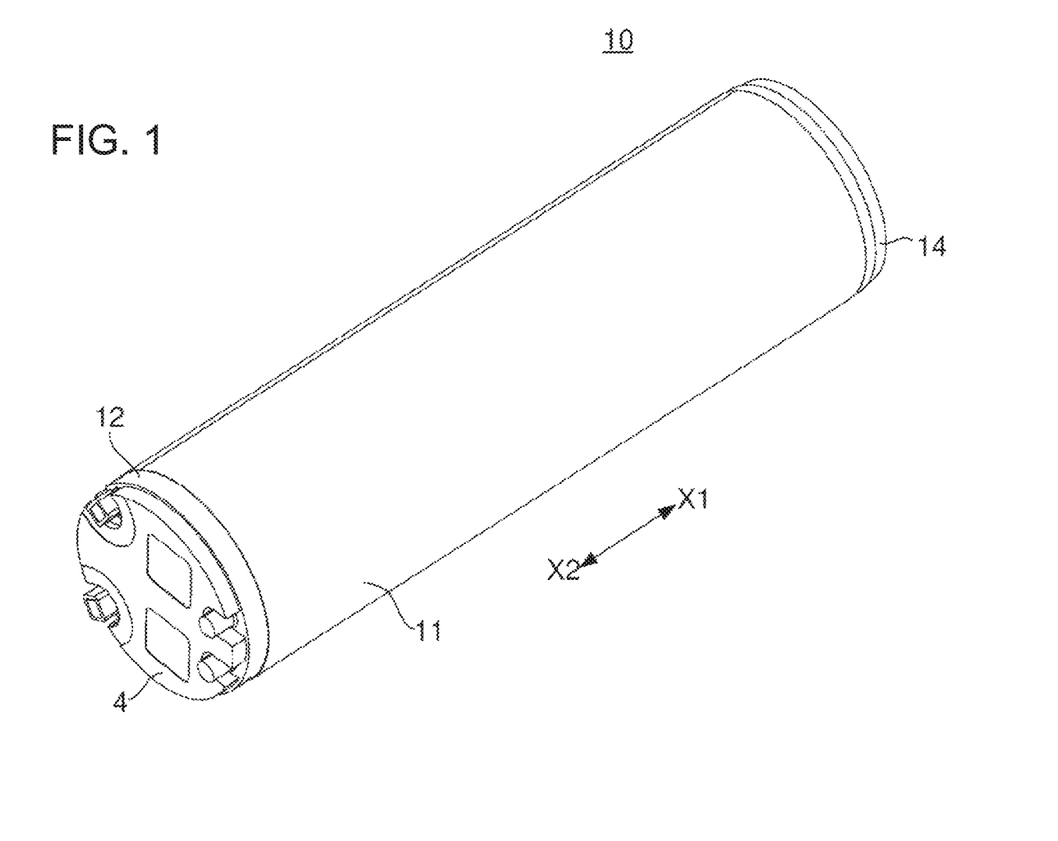
FIG. 1 is a perspective view of a vibrating motor according to a first example embodiment of the present disclosure.
Figure 2:
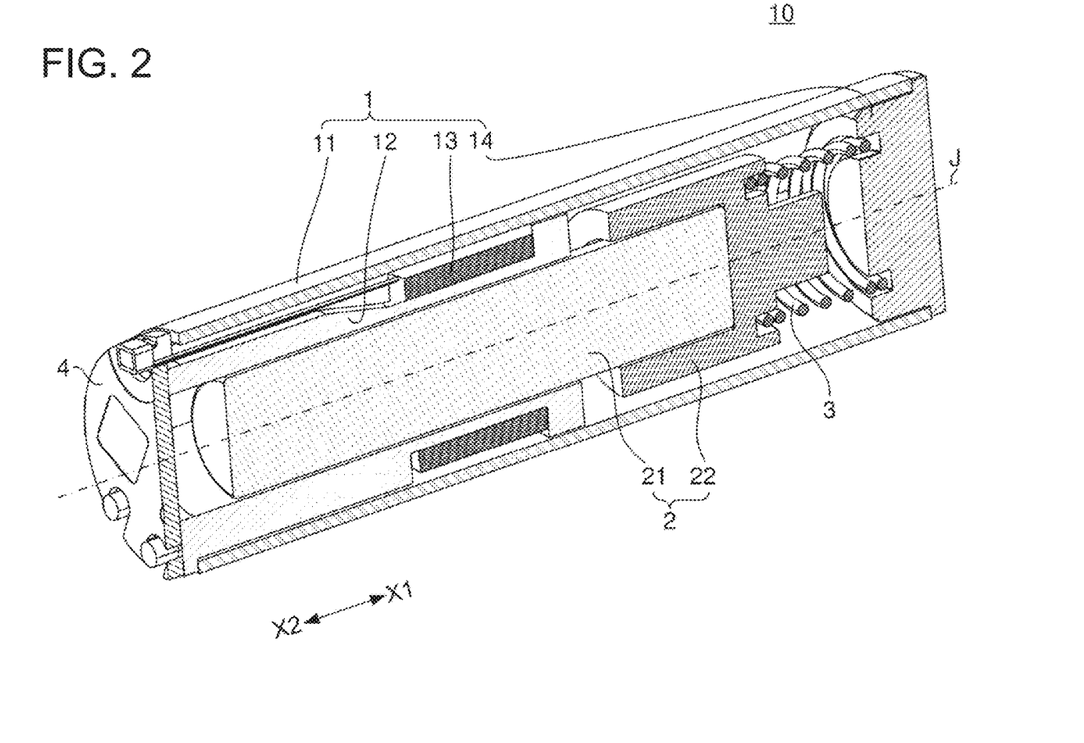
FIG. 2 is a longitudinal sectional perspective view of the vibrating motor according to the first example embodiment of the present disclosure.
Figure 3:
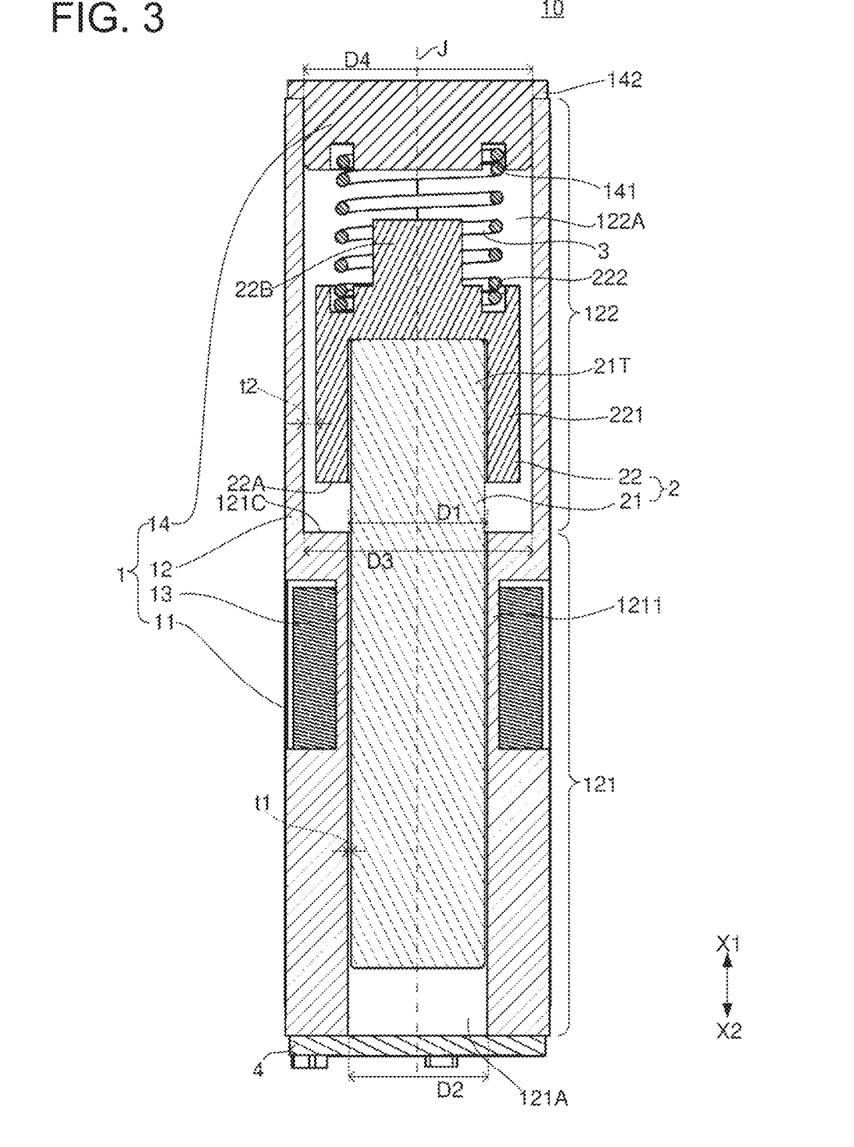
FIG. 3 is a longitudinal sectional view of the vibrating motor according to the first example embodiment of the present disclosure.

FIG. 1 is a perspective view of the vibrating motor 10 according to a first example embodiment of the present disclosure. FIG. 2 is a longitudinal sectional perspective view of the vibrating motor 10 illustrated in FIG. 1. FIG. 3 is a longitudinal sectional view of the vibrating motor 10 illustrated in FIG. 1.

The vibrating motor 10 includes a stationary portion 1 and a movable portion 2. In this example embodiment, the vibrating motor 10 further includes an elastic portion 3 and a board 4. The movable portion 2 extends along the center axis J. The movable portion 2 can vibrate with respect to the stationary portion 1 along the center axis J. That is, the movable portion 2 can vibrate with respect to the stationary portion 1 along the center axis J extending in the vertical direction.

The stationary portion 1 includes a bearing portion 12, a coil 13, and a top surface portion 14. In this example embodiment, the stationary portion 1 further includes a cover 11.

The bearing portion 12 is a tubular sleeve bearing extending along the center axis J. The bearing portion 12 is made of, for example, a resin having a low friction coefficient and a low wear property. The resin is, for example, polyacetal (POM). The bearing portion 12 supports the movable portion 2 so as to be able to vibrate along the center axis J, and has a tubular shape extending along the center axis J.

The bearing portion 12 has a first region 121 and a second region 122. The second region 122 is arranged above the first region 121. Both the first region 121 and the second region 122 have a cylindrical shape extending along the center axis J. A hollow portion 121A is formed inside the first region 121. A hollow portion 122A is formed inside the second region 122.

The first region 121 and the second region 122 are integrally formed. That is, the bearing portion 12 is a single member formed by integral molding.

In the configuration illustrated in FIG. 3, the inner diameter of the first region 121 increases toward the lower side. More specifically, the inner diameter of the first region 121 continuously increases downward from an inner diameter D1 at the upper end to an inner diameter D2 at the lower end. In the side sectional view illustrated in FIG. 3, the outer edge of the hollow portion 121A is linearly inclined downward and radially outward.

In the configuration illustrated in FIG. 3, the inner diameter of the second region 121 increases toward the upper side. More specifically, the inner diameter of the second region 122 continuously increases upward from an inner diameter D3 at the lower end to an inner diameter D4 at the upper end. In the side sectional view illustrated in FIG. 3, the outer edge of the hollow portion 122A is linearly inclined upward and radially outward.

As a result, the mold for forming each of the first region 121 and the second region 122 is easily removed, and mass productivity is improved.

Incidentally, for example, a plurality of regions having a constant inner diameter in the vertical direction may be arranged in the vertical direction from the inner diameter D1 to the inner diameter D2 or from the inner diameter D3 to the inner diameter D4, and the inner diameter may be discontinuously increased toward the lower side or the upper side. This also makes it easy to remove the mold.

A conductive wire is wound around a radially outer periphery at an intermediate position of the first region 121 in the vertical direction to form a coil 13. The coil 13 is formed by winding a conductive wire around the center axis J. The radially inner surface of the coil 13 is in contact with the radially outer surface of the first region 121. That is, the first region 121 includes a coil inner region 1211 arranged on the radially inner side of the coil 13.

The radially outer end position of the first region 121 coincides with the radially inner end position of the coil 13. As a result, at the time of manufacturing the vibrating motor 10, the coil 13 can be wound around the first region 121 after the bearing portion 12 is formed, and thus the manufacturing cost can be reduced.

The coil 13 is fixed to the first region 121. That is, the coil 13 is fixed to the radially outer surface of the bearing portion 12. As a result, a gap between movable portion 2 and coil 13 can be appropriately secured. Further, the vertical length in which the movable portion 2 and the first region 121 directly face each other in the radial direction can be increased, and the inclination of the movable portion 2 at the time of vibration can be suppressed.

The minimum inner diameter D3 of the second region 122 is larger than the maximum inner diameter D2 of the first region 121.

The movable portion 2 includes a core portion 21 and a holding portion 22.

The core portion 21 is a columnar member extending along the axial direction. The core portion 21 includes, for example, two magnets arranged in the vertical direction, and a magnetic material vertically sandwiched by the magnets. In this case, for example, the lower side of the upper magnet is the N pole, and the upper side is the S pole. The upper side of the lower magnet is the N pole, and the lower side is the S pole. That is, the N poles face each other in the vertical direction with the magnetic material interposed therebetween. Incidentally, the magnetic pole of each magnet may be opposite to the above in the vertical direction.

The holding portion 22 is fixed to an upper end portion 21T of the core portion 21 by adhesion or the like to hold the core portion 21. That is, the core portion 21 extends along the center axis J and is housed in the bearing portion 12. The holding portion 22 and the upper end portion 21T are housed in the second region 122. At least a part of the holding portion 22 is arranged above the coil 13. That is, at least a part of the holding portion 22 is arranged above the coil 13 and holds the core portion 21. The holding portion 22 has a cylindrical core cover portion 221 extending along the center axis J below. The core cover portion 221 surrounds the radially outer surface of the upper end portion 21T (core portion 21) from the radially outer side. The second region 122 faces the core cover portion 221 in the radial direction. That is, the holding portion 22 includes the core cover portion 221 which surrounds the radially outer surface of the core portion from the radially outer side, and the second region 122 is arranged to face the holding portion 22 in the radial direction with a second gap t2 interposed therebetween. Since the radially outer surface of the core portion 21 is held by the core cover portion 221, the coaxiality between the holding portion 22 and the core portion 21 is improved.

The holding portion 22 functions as a weight and is made of metal, for example. An example of the metal is a tungsten alloy.

The holding portion 22 has an annular recess 222 recessed downward in an annular shape from the upper surface. The lower end portion of the elastic portion 3 is fixed to the annular recess 222. The elastic portion 3 is fixed to the annular recess 222 by welding or adhesion, for example. That is, the elastic portion 3 is arranged above the holding portion 22. The lower end portion of the elastic portion 3 is fixed to the upper end portion of the holding portion 22. The elastic portion 3 is housed in the second region 122.

The top surface portion 14 is a substantially disk-shaped lid member centered on the center axis J. The top surface portion 14 has an annular recess 141 which is annularly recessed upward from the lower surface. The upper end portion of the elastic portion 3 is fixed to the annular recess 141. The elastic portion 3 is fixed to the annular recess 141 by welding or adhesion, for example. That is, the top surface portion 14 is arranged above the movable portion 2 and is connected to the movable portion 2 with the elastic portion 3 interposed therebetween. The holding portion 22 is connected to the top surface portion 14 with the elastic portion 3 interposed therebetween.

The top surface portion 14 has a top surface flange portion 142 protruding in the radial direction. At the time of manufacturing the vibrating motor 10, the top surface portion 14 is inserted into the second region 122 from above. At this time, the lower surface of the top surface flange portion 142 is in contact with the upper surface of the second region 122 in the vertical direction. That is, the upper surface of the second region 122 is in contact with the lower surface of the top surface portion 14 in the vertical direction. As a result, the top surface portion 14 can be positioned in the vertical direction with respect to the second region 122. The second region 122 is fixed to the top surface portion 14. More specifically, in a state where the top surface portion 14 is arranged in the second region 122, the second region 122 is fixed to the top surface portion 14.

With such a configuration, the movable portion 2 is supported by the top surface portion 14 with the elastic portion 3 interposed therebetween. In a state where the elastic portion 3 has a natural length, as illustrated in FIG. 3, a lower part of the core portion 21 is housed in the first region 121. As a result, the core portion 21 is supported by the first region 121 so as to be able to vibrate along the center axis J. That is, the bearing portion 12 supports the movable portion 2 so as to be able to vibrate along the center axis J. That is, the bearing portion 12 extends along the center axis J and supports the movable portion 2 so as to be able to vibrate along the center axis J. Further, the lower side of the movable portion 2 is supported by the bearing portion 12, but the lower side of the movable portion 2 is not supported in the axial direction. As a result, as compared with a case where the movable portion is supported by an elastic portion or the like from both sides of the vertical direction, it is possible to suppress the restoring force of the movable portion in the vertical direction from becoming larger than necessary. Therefore, the vibration of the movable portion in the vertical direction can be increased. Further, since it is not necessary to arrange the elastic portion below the movable portion 2, the configuration of the vibrating motor 10 is simplified, and mass productivity is improved.

In a state where the elastic portion 3 has a natural length, as illustrated in FIG. 3, a part of the core portion 21 faces the coil 13 in the radial direction with the coil inner region 1211 interposed therebetween. That is, the coil 13 indirectly faces at least a part of the movable portion 2 in the radial direction. Incidentally, the coil 13 may be arranged on the radially inner side of the first region 121, and the coil 13 may directly face at least a part of the movable portion 2 in the radial direction.

When the coil 13 is energized, a magnetic field is generated from the coil 13. The movable portion 2 vibrates in the vertical direction by the interaction between the generated magnetic field and the magnetic field by the core portion 21.

As illustrated in FIG. 3, in a state where the elastic portion 3 has a natural length, the first region 121 is arranged to face the movable portion 2 (core portion 21) in the radial direction with the first gap t1 interposed therebetween. Further, the second region 122 is arranged to face the movable portion 2 (the core portion 21 and the holding portion 22) in the radial direction with the second gap t2 interposed therebetween.

The maximum first gap t1 is narrower than the minimum second gap t2. Under the condition of the inner diameters of the first region 121 and the second region 122 described above, the maximum first gap t1 is a gap between the lower end of the core portion 21 and the first region 121, and the minimum second gap t2 is a gap between the lower end of the holding portion 22 and the second region 122. That is, the second gap t2 is wider than the first gap t1. That is, the second region 122 is arranged above the first region 121 and is arranged to face the movable portion 2 in the radial direction with the second gap t2 wider than the first gap t1 interposed therebetween.

As a result, the first gap t1 between the first region 121 and the movable portion 2 is reduced, and the movable portion 2 can slide on the radially inner surface of the first region 121. Further, the second gap t2 between the second region 122 and the movable portion 2 is increased, and a gap can be secured between the movable portion 2 and the radially inner surface of the second region 122 in the radial direction. As a result, the vibration characteristics of the movable portion 2 can be improved.

The second region 122 is arranged to face the holding portion 22 in the radial direction with the second gap t2 interposed therebetween. As a result, it is possible to secure an appropriate gap in the radial direction between the holding portion 22 and the second region 122 while firmly holding the core portion 21 by the holding portion 22.

In particular, in this example embodiment, the second region 122 integrally configured with the first region 121 supporting the movable portion 2 is fixed to the top surface portion 14, and the top surface portion 14 is connected to the movable portion 2 with the elastic portion 3 interposed therebetween, so that the coaxiality between the movable portion 2 and the bearing portion 12, particularly, the first region 121 is improved. The coaxiality is a degree of deviation of the center axis. As a result, the accuracy of the radial position of the movable portion 2 can be improved, and the vibration characteristics can be improved. Further, the number of members is reduced by integrally molding the first region 121 and the second region 122.

As illustrated in FIG. 3, an upper surface 121C of the first region 121 vertically faces a lower surface 22A of the holding portion 22. As a result, the lower surface 22A of the holding portion 22 can come into contact with the upper surface 121C of the first region 121, and the movable portion 2 can be restricted from moving downward more than necessary.

The holding portion 22 has a protruding portion 22B protruding upward. The upper surface of the protruding portion 22B faces the lower surface of the top surface portion 14 in the vertical direction. As a result, the upper surface of the protruding portion 22B can come into contact with the lower surface of the top surface portion 14, and the movable portion 2 can be restricted from moving upward more than necessary.

As illustrated in FIG. 1, the cover 11 is arranged on the radially outer side of the bearing portion 12. The radial thickness of the cover 11 is smaller than the radial thickness of the bearing portion 12. As a result, the cover 11 can be formed of a tape, and the weight of the vibrating motor 10 can be reduced. The cover 11 is, for example, a tape using a polyimide film as a base material.

At least a part of the cover 11 is arranged on the radially outer side of the coil 13 (FIG. 2). As a result, it is possible to suppress the intrusion of foreign matter into the coil 13.

Figure 4:
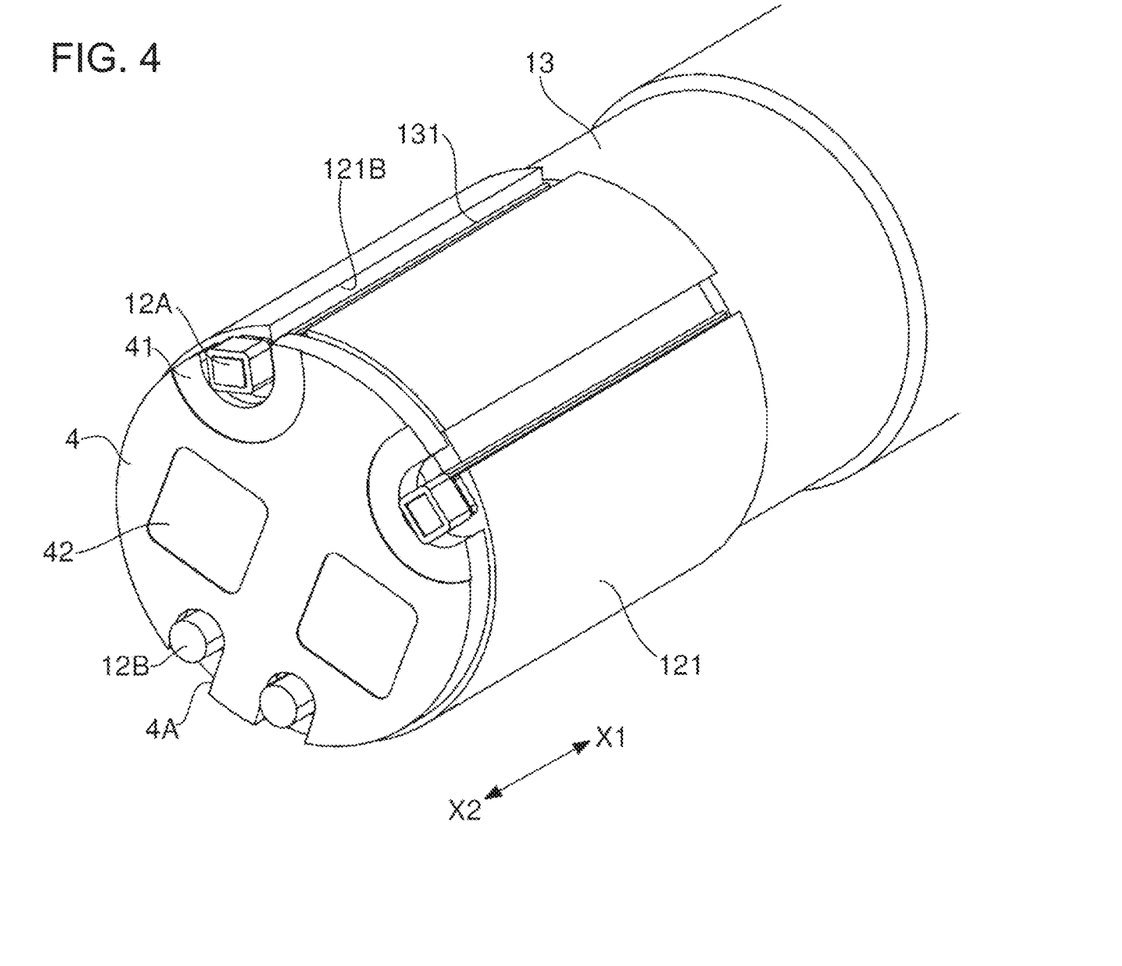
FIG. 4 is a perspective view illustrating a configuration related to electrical connection between a board and a coil according to an example embodiment of the present disclosure.

FIG. 4 is a perspective view illustrating a configuration related to electrical connection between the board and the coil 13. As illustrated in FIG. 4, a recess 121B extending in the vertical direction and recessed radially inward is formed on the radially outer surface of the first region 121 in the bearing portion 12. A part of the lead wire 131 drawn out from the coil 13 is housed in the recess 121B. Incidentally, the entire lead wire 131 may be housed in the recess 121B.

That is, it is sufficient if at least a part of the lead wire 131 is housed in the recess 121B.

As a result, it is not necessary to route the lead wire 131 radially outward of the bearing portion 12. Therefore, as compared with a case where the lead wire 131 is routed radially outward of the bearing portion 12, in the vibrating motor 10, the lead wire 131 can be suppressed from interfering with other portions or other members, and the vibrating motor 10 can be downsized in the radial direction. Further, the manufacturing efficiency of the vibrating motor 10 is improved.

As illustrated in FIG. 4, the board 4 is arranged below the first region 121 and expands in the radial direction. That is, the board 4 expands in a direction intersecting the center axis J. The board 4 may be a flexible printed circuit board or a rigid printed circuit board.

The bearing portion 12 has a protruding portion 12A protruding downward from the lower surface of the first region 121. The lower end portion of the lead wire 131 drawn out downward is wound around the protruding portion 12A. That is, the lead wire 131 is tied to the protruding portion 12A.

The board 4 includes a first electrode portion 41 and a second electrode portion 42. The first electrode portion 41 and the second electrode portion 42 are electrically connected by a wiring pattern (not illustrated in FIG. 4) inside the board 4. At the time of manufacturing the vibrating motor 10, an operation of attaching the board 4 to the first region 121 and electrically connecting the first electrode portion 41 and the lead wire 131 tied to the protruding portion 12A by soldering or the like is performed. The operation may be performed automatically or manually. Therefore, the vibrating motor 10 can be manufactured with more excellent workability compared to the case of directly connecting the lead wire to the board.

In this manner, the lower end portion of the lead wire 131 drawn out downward from the coil 13 is electrically connected to the board 4. As a result, the routing of the lead wire 131 for electrically connecting the coil 13 and the board 4 is facilitated.

The board 4 has a plurality of notch portions 4A recessed from the radially outer edge of the board 4 in a direction of approaching the center axis J. The bearing portion 12 has a plurality of protruding portions 12B protruding downward from the lower surface of the first region 121. The plurality of protruding portions 12B are housed in the plurality of notch portions 4A. As a result, the board 4 can be positioned.

As illustrated in FIG. 3, the board 4 overlaps the lower end of the hollow portion 121A in the vertical direction in a state where the board 4 is attached to the lower end portion of the first region 121. As a result, it is possible to suppress intrusion of foreign matter into the bearing portion 12.

Figure 5:
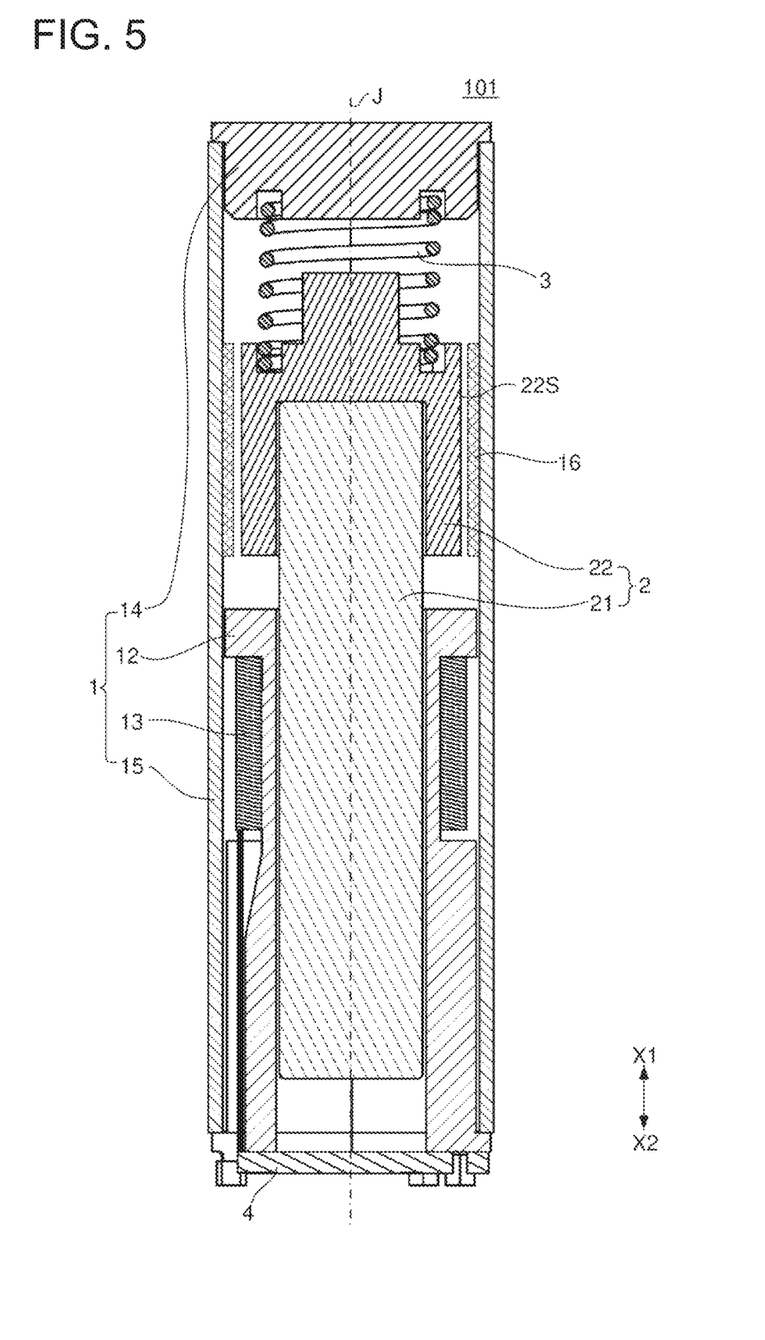
FIG. 5 is a longitudinal sectional view of a vibrating motor according to a second example embodiment of the present disclosure.

FIG. 5 is a side sectional view of a vibrating motor 101 according to a second example embodiment. Here, differences from the first example embodiment will be mainly described.

The vibrating motor 101 illustrated in FIG. 5 includes the stationary portion 1. The stationary portion 1 includes a housing 15 in addition to the bearing portion 12, the coil 13, and the top surface portion 14. That is, the vibrating motor 101 includes the stationary portion 1 and the movable portion 2. The movable portion 2 can vibrate with respect to the stationary portion 1 along the center axis J extending in the vertical direction. The stationary portion 1 includes the bearing portion 12, the coil 13, and the housing 15. The bearing portion 12 supports the movable portion 2 so as to be able to vibrate along the center axis J, and has a tubular shape extending along the center axis J. The coil 13 directly or indirectly faces at least a part of the movable portion 2 in the radial direction.

The housing 15 has a cylindrical shape extending along the center axis J. That is, the housing 15 is formed in a tubular shape extending along the center axis J. The housing 15 is made of a magnetic material. The magnetic material is stainless steel, for example.

The housing 15 houses the bearing portion 12, the coil 13, and the movable portion 2. An upper part of the core portion and the holding portion 22 are arranged above the bearing portion 12 inside the housing 15.

An outer cylinder portion 16 is arranged on the radially inner surface of the housing 15. The outer cylinder portion 16 has a cylindrical shape extending along the center axis J. The outer cylinder portion 16 faces the holding portion 22 in the radial direction with a gap interposed therebetween. More specifically, in a state where the elastic portion 3 has a natural length, the outer cylinder portion 16 faces the holding portion 22 in the radial direction with a gap interposed therebetween. The outer cylinder portion 16 is made of a non-magnetic material.

The housing 15 is desirably made of a magnetic material as described above in order to suppress leakage of magnetic flux to the outside of the vibrating motor 10 and to increase rigidity of the vibrating motor 10. Even in this case, the movable portion is suppressed from being attracted toward the housing 15 by providing the outer cylinder portion 16 made of a non-magnetic material. Therefore, the accuracy of the radial position of the movable portion 2 is improved, so that the vibration characteristics can be improved.

The movable portion 2 includes the core portion 21 and the holding portion 22. The core portion 21 extends along the center axis J and is housed in the bearing portion 12. At least a part of the holding portion 22 is arranged above the coil 13 and holds the core portion 21. The holding portion 22 is made of a magnetic material. The magnetic material is, for example, a metal. The metal is, for example, a tungsten alloy.

The radially inner surface of the outer cylinder portion 16 faces a radially outermost surface 22S of the holding portion 22 with a gap interposed therebetween in the radial direction. The vertical length of the outer cylinder portion 16 is equal to the vertical length of the outermost surface 22S. Even when both the holding portion 22 and the housing 15 are made of a magnetic material, the holding portion 22 can be suppressed from being attracted toward the housing 15 by providing the outer cylinder portion 16 made of a non-magnetic material. Further, the weight of the vibrating motor 10 can be reduced by reducing the vertical length of the outer cylinder portion 16 as much as possible.

Figure 6:
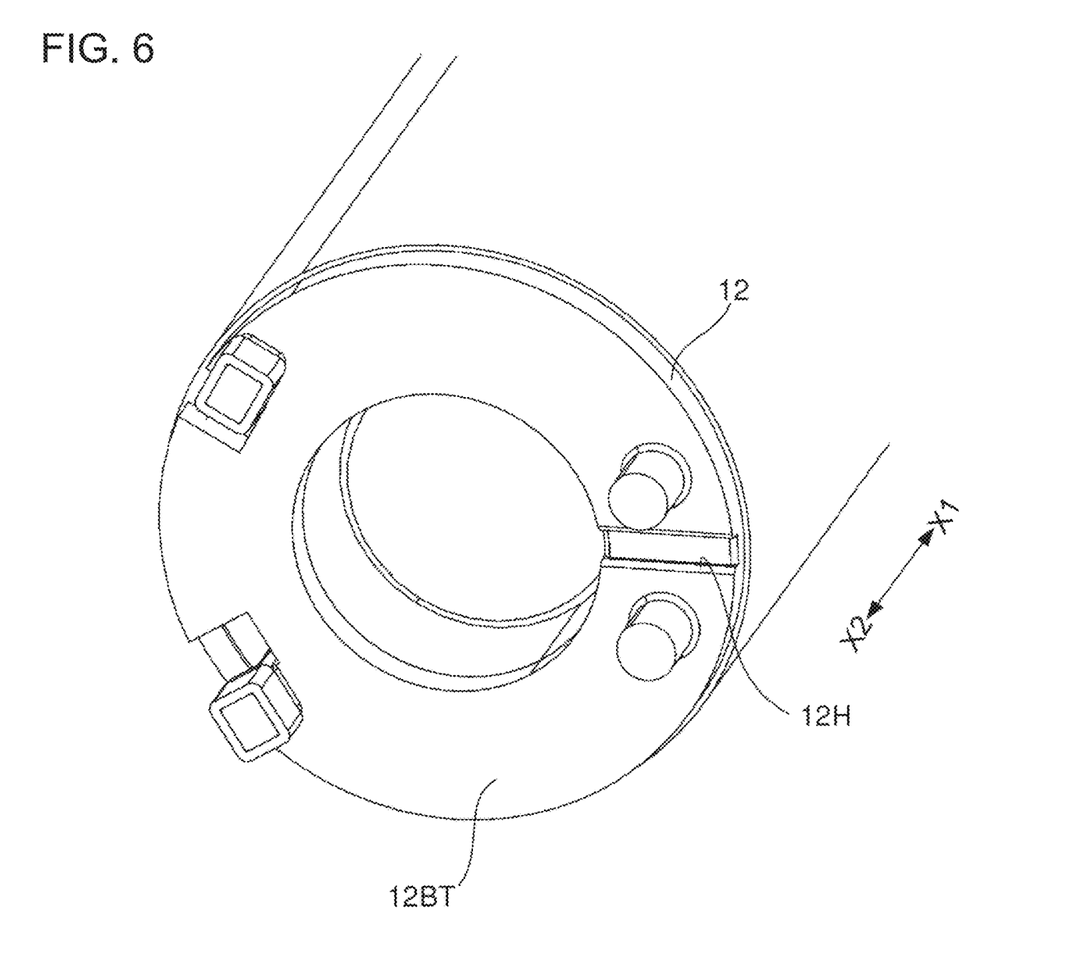
FIG. 6 is a perspective view illustrating a lower end portion of a bearing portion according to a modification of an example embodiment of the present disclosure.

FIG. 6 is a perspective view illustrating a lower end portion 12BT of the bearing portion 12 according to a modification. FIG. 6 is a view of a state in which the board 4 is detached.

As illustrated in FIG. 6, a groove-shaped communication portion 12H extending in the radial direction and recessed upward from the lower surface of the bearing portion 12 is formed in the lower end portion 12BT. The communication portion 12H allows the radially inner space and the radially outer space of the lower end portion 12BT to communicate with each other. That is, the bearing portion 12 has the communication portion 12H for communicating the radially inner space and the radially outer space of the bearing portion 12. As a result, in a case where the movable portion 2 vibrates up and down, the gas inside the bearing portion 12 is discharged to the outside of the bearing portion 12 through the communication portion 12H, so that it is possible to suppress a decrease in amplitude of vibration due to compression of the gas inside the bearing portion 12. Further, in the configuration in which the board 4 is arranged below the bearing portion 12 as in this example embodiment, a configuration in which the communication portion 12H is provided to discharge the gas inside the bearing portion 12 to the outside of the bearing portion 12 is particularly useful.

Incidentally, the communication portion 12H is not limited to the groove shape, and may be formed as, for example, a through-hole penetrating the bearing portion 12 in the radial direction.

Figure 7:
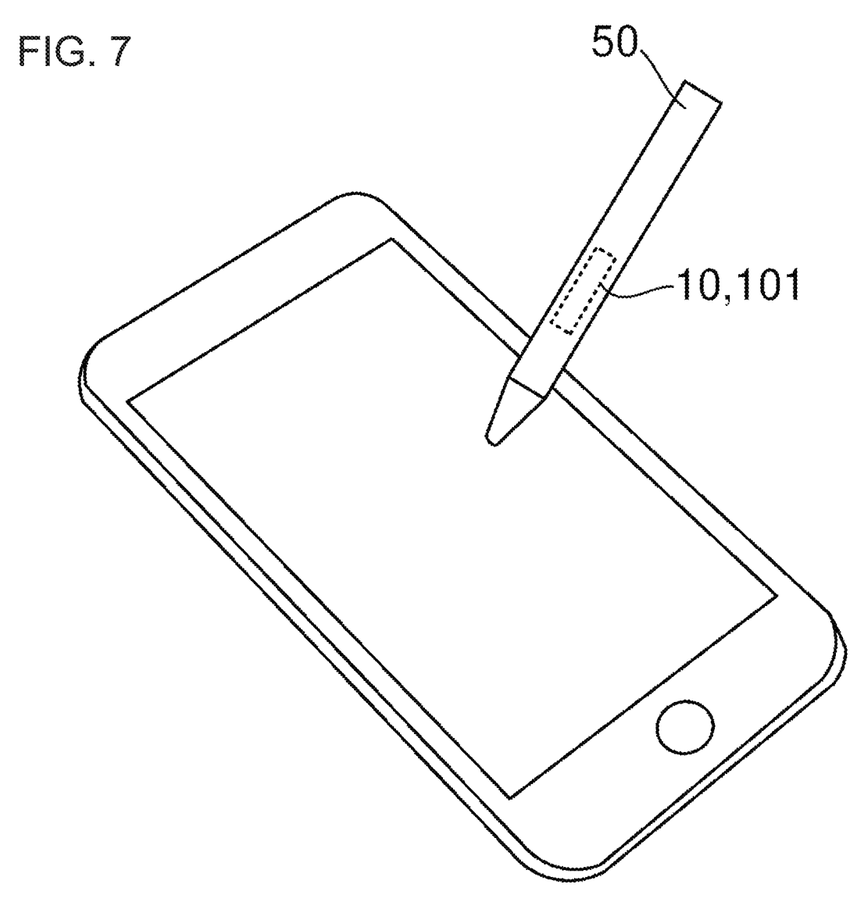
FIG. 7 is a view schematically illustrating a touch pen mounted with a vibrating motor according to an example embodiment of the present disclosure.

FIG. 7 is a view schematically illustrating a touch pen 50 as an example of a target device mounted with the vibrating motor 10 or 101 according to the first example embodiment or the second example embodiment. The touch pen 50 is a device which operates a device such as a smartphone or a tablet by being brought into contact with a touch panel of the device. When the touch pen 50 is mounted with the vibrating motor 10 or 101, the touch pen 50 can be vibrated to give haptic feedback to the user. That is, a haptic device includes the vibrating motor 10 or 101. The touch pen 50 is an example of the haptic device including the vibrating motor 10. As a result, for example, the haptic feedback can give the user a feeling as if a character or the like is written on paper or the like with the touch pen 50. When the haptic device is mounted with the vibrating motor 10 or 101, the vibration characteristics of the haptic device can be improved.

The target device is not limited to the touch pen, and various devices such as an aerial operation device can be mounted with the vibrating motor 10 or 101.

The present disclosure can be used for a vibrating motor mounted in various devices such as a touch pen, for example.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A vibrating motor comprising: a stationary portion; and a movable portion able to vibrate with respect to the stationary portion along a center axis extending in a vertical direction; wherein the stationary portion includes: a bearing portion which supports the movable portion to be able to vibrate along the center axis and has a tubular shape extending along the center axis; a coil which directly or indirectly opposes at least a portion of the movable portion in a radial direction; and a top surface portion which is above the movable portion and connected to the movable portion with an elastic portion interposed therebetween; the bearing portion includes: a first region which opposes the movable portion in the radial direction with a first gap interposed therebetween; and a second region which is above the first region and opposed to the movable portion in the radial direction with a second gap wider than the first gap interposed therebetween; the first region and the second region are integrally provided; and the second region is fixed to the top surface portion wherein the movable portion includes: a core portion which extends along the center axis and is housed in the bearing portion; and a holding portion at least a portion of which is above the coil and which holds the core portion; the holding portion is connected to the top surface portion with the elastic portion interposed therebetween; and the second region opposes the holding portion in the radial direction with the second gap interposed therebetween, wherein the holding portion includes a core cover portion which surrounds a radially outer surface of the core portion from a radially outer side; and the second region opposes the core cover portion in the radial direction.

2. The vibrating motor according to claim 1, wherein an upper surface of the second region is in contact with a lower surface of the top surface portion in the vertical direction.

3. The vibrating motor according to claim 1, wherein an upper surface of the first region opposes a lower surface of the holding portion in the vertical direction.

4. The vibrating motor according to claim 1, wherein an inner diameter of the first region increases toward a lower side; and an inner diameter of the second region increases toward an upper side.

5. A haptic device comprising: the vibrating motor according to claim 1.

6. The vibrating motor according to claim 1, wherein the coil is fixed to a radially outer surface of the bearing portion.

7. The vibrating motor according to claim 6, wherein the stationary portion includes a cover at least a portion of which is on a radially outer side of the coil.

8. The vibrating motor according to claim 7, wherein a radial thickness of the cover is smaller than a radial thickness of the bearing portion.

9. A vibrating motor comprising: a stationary portion; and a movable portion able to vibrate with respect to the stationary portion along a center axis extending in a vertical direction; wherein the stationary portion includes: a bearing portion which supports the movable portion to be able to vibrate along the center axis and has a tubular shape extending along the center axis; a coil which directly or indirectly opposes at least a portion of the movable portion in a radial direction; and a housing which includes a tubular shape extending along the center axis and made of a magnetic material; the housing houses the bearing portion, the coil, and the movable portion; and an outer cylinder portion which opposes the movable portion in the radial direction with a gap interposed therebetween and is made of a non-magnetic material, is on a radially inner surface of the housing, wherein the movable portion includes: a core portion which extends along the center axis and is housed in the bearing portion; and a holding portion at least a portion of which is above the coil and which holds the core portion; the holding portion is connected to a top surface portion with an elastic portion interposed therebetween; and a second region opposes the holding portion in the radial direction with a second gap interposed therebetween, wherein the holding portion includes a core cover portion which surrounds a radially outer surface of the core portion from a radially outer side; and the second region opposes the core cover portion in the radial direction.

10. The vibrating motor according to claim 9, wherein the holding portion at least the portion of which is above the coil is made of a magnetic material; a radially inner surface of the outer cylinder portion opposes a radially outermost surface of the holding portion in the radial direction with another gap interposed therebetween; and a vertical length of the outer cylinder portion is equal or substantially equal to a vertical length of the outermost surface.

11. A haptic device comprising:
the vibrating motor according to claim 9.

* * * * *